United States Patent [19]
Hawk

[11] 4,179,185
[45] Dec. 18, 1979

[54] COUPLER FOR OPTICAL COMMUNICATION SYSTEM

[75] Inventor: Robert M. Hawk, Bath, N.Y.

[73] Assignee: Corning Glass Works, Corning, N.Y.

[21] Appl. No.: 881,623

[22] Filed: Feb. 27, 1978

[51] Int. Cl.$^2$ ............................................. G02B 5/16
[52] U.S. Cl. ................................................. 350/96.16
[58] Field of Search .............. 350/96.15, 96.16, 96.24

[56] References Cited
U.S. PATENT DOCUMENTS

| | | | |
|---|---|---|---|
| 3,874,781 | 4/1975 | Thiel | 350/96.16 |
| 3,912,362 | 10/1975 | Hudson | 350/96.20 |
| 4,083,625 | 4/1978 | Hudson | 350/96.15 |

OTHER PUBLICATIONS

Barnoski et. al. "Fabrication of an Access Coupler with Single Strand Multimode Fiber Waveguides" *Applied Optics* vol. 15, No. 11, Nov. 1976 pp. 2629–2630.

*Primary Examiner*—Stewart J. Levy
*Attorney, Agent, or Firm*—William J. Simmons, Jr.; Walter S. Zebrowski

[57] ABSTRACT

A coupler for coupling an optical signal propagating in any one of a plurality of optical waveguide filaments to all of the remaining filaments. The coupler comprises a plurality of optical waveguide filaments, the end portions of which are fused together to form a unitary structure in which the filament cores are separated by only the filament cladding material. The end of the unitary structure is planar and is perpendicular to the axes of filament cores at the ends thereof. The end of the unitary structure is coated with a light reflecting material.

8 Claims, 5 Drawing Figures

COUPLER FOR OPTICAL COMMUNICATION SYSTEM

BACKGROUND OF THE INVENTION

Optical waveguide filaments are a promising transmission medium recently developed for use in optical communication systems. Such filaments generally consist of an optical fiber having a transparent core having a refractive index $n_1$ surrounded by a layer of transparent cladding material having a refractive index $n_2$ which is lower than $n_1$. Although the theory of optical waveguides has been known for some time, practical optical waveguides that do not absorb an excessive amount of transmitted light have been developed only recently. For example, U.S. Pat. No. 3,659,915 discloses a low loss optical waveguide comprising a cladding layer of fused silica and a core of fused silica doped with one or more materials that selectively increase the index of refraction of the core above that of the cladding. The optical signal transmission lines that are employed to transmit optical signals between stations may comprise a single optical waveguide or a bundle thereof.

To establish an optical communication system between a plurality of stations, a variety of interconnection schemes may be utilized. Each station can be "hard wired" to every other station, but when many stations must be interconnected, the excessive amount of optical signal transmission line required causes this method to be undesirable due to both the cost of the transmission line and the space consumed thereby. The stations may be interconnected by a loop data bus which drastically reduces the required amount of optical signal transmission line, but the large number of couplers required in such a system introduces an excessive amount of loss, especially in those systems in which there are many stations.

The optical communication network disclosed in U.S. Pat. No. 3,883,217 to R.E. Love et al. takes advantage of unique properties of optical signal transmission lines and enables the interconnection of a plurality of stations with much less transmission line than that which would be required by hard wiring, and yet it is not plagued by the losses encountered in the aforementioned loop data bus. Briefly, the communication network disclosed in said Love et al. patent, which is incorporated herein by reference, consists of a number of stations, all of which are connected by separate optical signal transmission lines to a common passive coupler which is adapted to receive an optical signal to the optical signal transmission line associated with each of the other stations. The coupler employed in this system should couple light from each optical signal transmission line to the remainder of such transmission lines and should introduce a minimum of loss into the system.

A passive coupler designed for use in the system of the Love et al. patent is taught in U.S. Pat. No. 3,874,781 issued to F.L. Thiel. That coupler comprises an elongated cylindrically shaped rod of transparent material having first and second endfaces that are substantially perpendicular to the axis thereof, the second endface having a light reflecting layer disposed thereon. Support means disposes the ends of the transmission lines in a bundled arrangement in such a manner that the optical waveguides of which the transmission lines are comprised terminate adjacent to the first endface of the rod, the axes of the waveguides being substantially parallel to the longitudinal axis of the rod. Light emanating from any one of the transmission lines diverges as it propagates through the rod. This light reflects from the light reflecting layer and again propagates through the rod to the input end thereof where it is coupled to all of the transmission lines. One of the insertion losses of this coupler is the packing fraction loss which is related to the packing fraction of the optical waveguides at the end of the cylindrically shaped rod, i.e., the ratio of the area of the fiber cores to the area of the entire rod endface. For example, only about 33% of the light uniformly illuminating the end of a bundle of filaments falls on the filament core areas, assuming the filaments are stacked in a close packed array and are circular filaments having an overall diameter of 5 mils and a cladding thickness of 1 mil.

SUMMARY OF THE INVENTION

It is therefore an object of the present invention to provide a low loss light coupler for interconnecting a plurality of optical waveguide filaments. Another object is to provide a device for coupling light from any one of a plurality of optical waveguide filaments to all of the remaining filaments.

Briefly, the present invention relates to a passive coupler for use in an optical communication system having a plurality of optical signal transmission lines each comprising at least one optical waveguide filament having a core of transparent material surrounded by a layer of transparent cladding material having a refractive index that is lower than that of the core material. The function of this coupler is to couple the optical signal in any one of the transmission lines to all of the remaining transmission lines. The coupler comprises a plurality of optical waveguide filaments the end portions of which are disposed in fused, side-by-side relation to form a unitary, multi-cored structure wherein the space between adjacent cores is occupied by only the cladding material. The cross-sectional shape of the multi-cored structure is substantially circular, and the end thereof opposite that from which the filaments extend is substantially perpendicular to the axes of the cores at that end. Means is disposed on that end for reflecting light, the wavelength of which is to be transmitted by the filaments.

BRIEF DESCRIPTION OF THE DRAWINGS

FIG. 2 is a cross-sectional view taken along lines 2-2 of FIG. 1.

DESCRIPTION OF THE PREFERRED EMBODIMENTS

Figure 1:
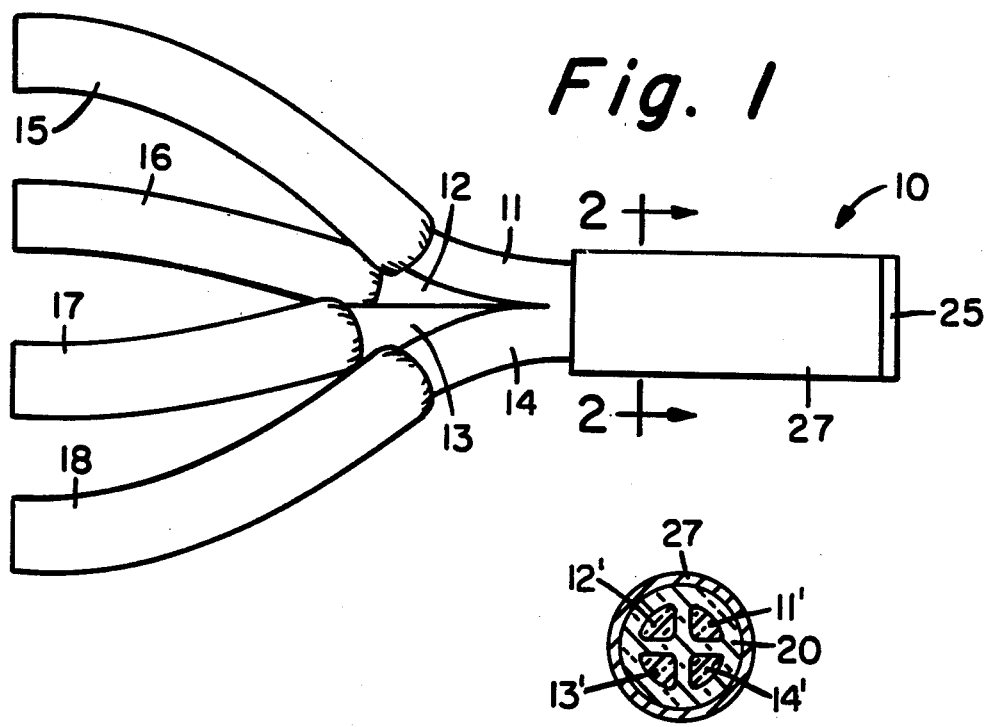
FIG. 1 is a side elevational view of an optical signal coupler constructed in accordance with the present invention.

FIG. 1 shows a passive optical signal coupler 10 used for interconnecting a plurality of optical waveguide filaments 11 through 14. Coupler 10 is formed by removing protective coatings or jackets 5 through 18 from the end portions of filaments 11 through 14 and grouping together in side-by-side relation the end portions while subjecting them to an elevated temperature sufficient to fuse the end portions together, whereby the interstices that had initially existed between the end portions are filled with only cladding material from the filaments. As shown in FIG. 2, cores 11' through 14' of filaments 11 through 14, respectively, are disposed in a unitary mass 20 of cladding material. After the end portions have been fused, the endface of the resultant multicored structure is ground perpendicular to the longitudinal axis of the end portions of the filament cores and is polished and provided with a layer 25 of highly reflective metal such as aluminum, gold or silver, or it is coated with dielectric material in a well known manner to form a mirror which reflects those wavelengths of light that are transmitted by the optical waveguide filaments. The outer surface of the multicored structure may be provided with a layer 27 of transparent cladding material having a refractive index $n_4$ sufficiently lower than that of cladding material 20 to reflect back into the multicored structure any light that is incident upon such cladding layer. A light reflecting interface could also be provided by polishing the surface of the multicored structure and utilizing air as the low index surrounding medium or by disposing on the surface a dielectric or metallic layer which is reflective to the wavelengths of light transmitted by the optical waveguide filaments.

Optical energy propagating in any one of the filaments toward the fused section is mixed among the other filaments by optical cross-talk in the multicored structure. The optical energy propagating in any of the cores 11' through 14' of the fused, multicored structure is reflected at layer 25 and propagated back through each of the cores with additional mixing or cross-talk taking place as the energy propagates back through the multicored structure. The length of fused section that is necessary to obtain sufficient coupling of energy from any filament to all of the remaining filaments depends upon such factors as the amount of cladding material separating the cores in the fused structure and the refractive indices of the filament core and cladding materials. Furthermore, for some applications it may not be necessary to provide equal coupling of light to all filaments; rather, the amount of coupling needed might be specified as some minimal amount of coupling to each filament.

Figure 3:
FIG. 3 illustrates a filament which may be employed in the coupler of the present invention.

Coupler 10 may be provided with means for enhancing the coupling of energy among the cores of the fused structure. The filament 11' illustrated in FIG. 3 has been subjected to an acid etch to remove a part of the cladding thereof. A part of the cladding could be etched from the entire end portion of the filament that is to be incorporated by infusion into the multicored structure, or only a part of the end portion of the filament might be treated in the manner illustrated in FIG. 3. By removing at least a portion of the cladding from at least a part of the end portions of the filaments that are to be fused to form the multicored structure, cross-talk among the cores will be enhanced.

Figure 4:
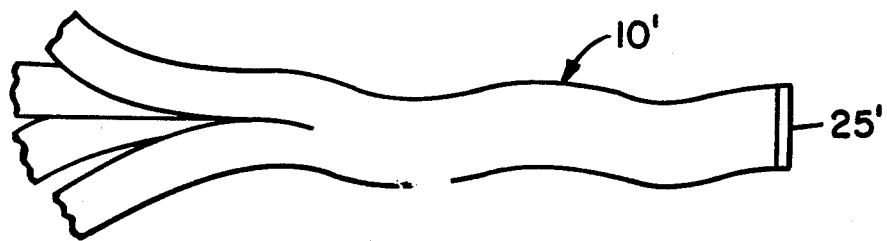
FIGS. 4 and 5 are modifications of the embodiment illustrated in FIG. 1.

The multicored structure could be subjected to a perturbation such as that illustrated in FIG. 4 to enhance cross-talk among the cores. In this embodiment the axis of the fused structure continuously changes direction. Other types of perturbation include changes in core diameter or the application of a bending forc to the multicored structure.

In the embodiments illustrated in FIGS. 1 and 4, a plurality of optical waveguide filaments are adapted to extend from coupler 10 and 10' to some distant station (not shown). The optical waveguide filaments which are to be interconnected are merely grouped together and maintained in parallel alignment while the end portions thereof are fused and otherwise treated as indicated hereinabove to form connectors 10 and 10'.

Figure 5:
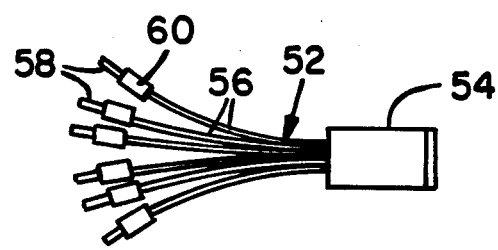

In the embodiment illustrated in FIG. 5, a short bundle 52 of optical waveguides is disposed adjacent to coupler 54 in the manner described in connection with the embodiment of FIG. 1. One or more of the fibers are then separated from bundle 52 to form short lengths of optical signal transmission lines 56, each of which is connected to longer lengths of optical signal transmission lines 58 by coupling means 60 which may be of the types disclosed in U.S. Pat. Nos. 3,846,010, 4,047,796, 4,050,781 or 4,050,783. Although coupling means 60 introduces some loss into the system, the embodiment of FIG. 5 may be preferred in that it can be manufactured under controlled conditions whereas the embodiment illustrated in FIGS. 1 and 4 may have to be fabricated in the field at the point of connection of a plurality of optical signal transmission lines.

I claim:

1. An optical signal coupler comprising a plurality of optical waveguide filaments each having a core of transparent material having a refractive index $n_1$ surrounded by a layer of transparent cladding material having a refractive index $n_2$ that is lower than $n_1$, the end portions of which are disposed in fused, side-by-side relation to form a unitary, multi-cored structure wherein the space between adjacent cores is occupied by only said cladding material, the cross-sectional shape of said multi-cored structure being substantially circular, the end of said multi-cored structure opposite that from which said filaments extend being planar and being substantially perpendicular to the axes of said cores at said end, means disposed on said end for reflecting light, the wavelength of which is to be transmitted by said optical waveguide filaments, and means in addition to the fusing together of said fibers for enhancing optical signal cross-talk among the cores of said multi-cored structure.

2. A coupler in accordance with claim 1 further comprising light-reflecting means disposed on the side surface of said multi-cored structure.

3. A coupler in accordance with claim 1 wherein each of said optical waveguide filaments is surrounded by a protective jacket, said jacket terminating short of the end portions of said filaments that are fused together.

4. A coupler in accordance with claim 1 wherein the ends of said optical waveguide filaments remote from said coupler terminate at an optical signal coupling means.

5. A coupler in accordance with claim 1 wherein the cross-sectional shape of the cores of said multi-cored structure is different from the cross-sectional shape of the cores of said filaments which extend from said structure.

6. A coupler in accordance with claim 1 wherein the total cross-sectional area of cladding material in said multi-cored structure is less than the total cross-sectional area of all filaments extending from said structure.

7. A coupler in accordance with claim 1 wherein said cross-talk enhancing means comprises means for perturbing energy propagating in the cores of said multi-cored structure.

8. An optical coupler in accordance with claim 7 wherein said perturbation means comprises changes in the direction of the axes of said cores of said multi-cored structure.

* * * * *